(12) United States Patent
Yakos et al.

(10) Patent No.: US 6,421,006 B1
(45) Date of Patent: Jul. 16, 2002

(54) GPS AUGMENTATION USING TIME OFFSET CODE MODULATION

(75) Inventors: Michael D. Yakos; John W. Murphy, both of Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/514,088

(22) Filed: Feb. 28, 2000

(51) Int. Cl.7 .................................................. G01S 1/24
(52) U.S. Cl. ......................................................... 342/387
(58) Field of Search ............................ 342/357.01, 387; 375/130

(56) References Cited

U.S. PATENT DOCUMENTS

| | | | | |
|---|---|---|---|---|
| 5,365,516 A | * | 11/1994 | Jandrell | 370/18 |
| 5,758,288 A | * | 5/1998 | Dunn et al. | 455/456 |
| 5,786,773 A | * | 7/1998 | Murphy | 340/947 |
| 5,923,287 A | * | 7/1999 | Lennen | 342/357 |
| 6,104,978 A | * | 8/2000 | Harrison et al. | 701/207 |
| 6,157,842 A | * | 12/2000 | Karlsson et al. | 455/456 |

* cited by examiner

*Primary Examiner*—Dao Phan
(74) *Attorney, Agent, or Firm*—Nathan O. Jensen; Kyle Eppele

(57) ABSTRACT

A positioning system incorporating a time offset into the pseudo random noise codes. Incorporating the time offset, a transmitter from a pseudo satellite sends pseudo random noise codes to a receiver which recognizes the pseudo random noise codes with the offset. The offset is typically done as one or more hours. Knowing the offset value, the receiver then acquires the signal, and uses it to determine position, distance, etc. The use of an offset allows conventional receivers to ignore the time offset signal by selecting a time offset value which is greater than the searching time allowed in the conventional receiver. Equipment capable of recognizing the time offset signal is capable of thereby ignoring and/or distinguishing incoming signals from other sources.

13 Claims, 1 Drawing Sheet

GPS AUGMENTATION USING TIME OFFSET CODE MODULATION

BACKGROUND OF THE INVENTION

1. Field of the Invention

The present invention relates generally to radio positioning systems and in particular to the augmentation of GPS using time offset code modulation.

2. Problems in the Art

Currently, there are at least 24 satellites orbiting earth dedicated to providing service for the Global Positioning System (GPS). GPS is run and managed by the U.S. Department of Defense. GPS satellites transmit a pseudo random noise code signal to receivers on the earth or in its atmosphere. Such receivers are designed to search for a code that matches a code stored in an almanac which is carried by the receiver. The almanac tells the receiver where the satellite, or the source of that particular code, is located in space. Searching is typically done only for a specified amount of time. Upon matching the sent code to the stored code prior to the end of the search time, the receiver obtains a lock on the signal. Through mathematics the receiver may use this signal along with measurements from three or more other satellites to determine. the distance the receiver is from the satellite. Such information may then be used for various purposes, such as computing the location of the receiver on a map, the distance the receiver is from the ground or any other set reference point, or determining time to a high degree of accuracy.

Pseudo satellites, commonly referred to as pseudolites, are essentially non-orbiting transmitters which transmit a signal identical or similar to the pseudo random noise code sent out by GPS satellites.

Pseudolites are used for a wide variety of purposes, including enhancing GPS signals, providing GPS like positioning within a line of sight barrier, and various other ranging, surveying and positioning purposes. While pseudolites work well for those situations, they can cause significant errors in conventional GPS applications.

Because of the reuse of GPS signals, Pseudolite transmissions are often indistinguishable from actual satellite transmissions. As most GPS applications require the GPS receiver to base its calculations on the position of the GPS satellite, when the same signal is received from a different location without the receiver's knowledge, the calculations of the receiver will likely have large errors associated with them if the receiver is able to achieve a lock on a signal at all.

To overcome these errors, it is desirable to be able to distinguish a pseudolite from a real orbiting satellite.

As GPS satellites are in orbit around the earth, hardware modifications would be very costly and endanger human lives.

It is therefore desirable to be able to distinguish between a pseudolite and a satellite without hardware modifications. There is therefore a need for a positioning system which avoids these and other problems.

FEATURES OF THE INVENTION

A general feature of the present invention is the provision of a positioning system which overcomes the problems and deficiencies found in the prior art.

A further feature of the present invention is the provision of a positioning system which is capable of distinguishing between satellite and pseudolite transmissions.

A further feature of the present invention is the provision of a positioning system which is capable of distinguishing between satellite and pseudolite transmissions without the need for hardware modifications.

Another feature of the present invention is the provision of a positioning system which allows the re-use of currently available pseudo random noise codes for many differing applications, all of which may operate simultaneously using the same pseudo random noise code.

These, as well as other features and advantages of the present invention, will become more apparent from the following specification and claims.

SUMMARY OF THE INVENTION

The present invention generally comprises a radio positioning system, and in particular a positioning system which is modified to include the augmentation of GPS using time offset code modulation. The present invention uses a transmitter to send a pseudo random noise code signal to a receiver. The sent signal includes a time offset. The receiver is programmed to account for the time offset and receive the pseudo random noise code signal.

DETAILED DESCRIPTION OF THE PREFERRED EMBODIMENT(S)

Figure 1:
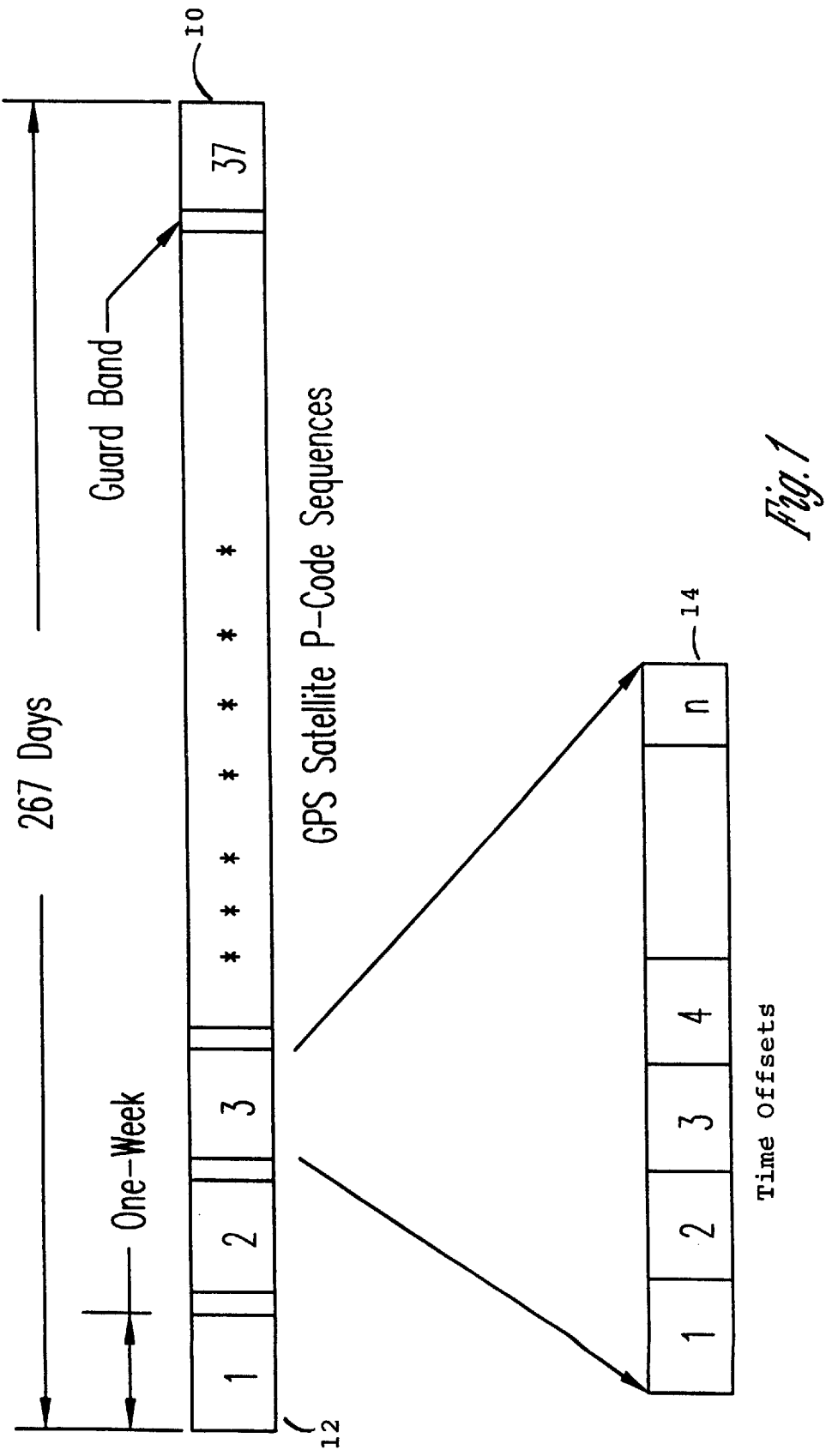
FIG. 1 is a pictorial view showing the time offset code representation according to an embodiment of the present invention.

The present invention will be described as it applies to its preferred embodiment. It is not intended that the present invention be limited to the described embodiment. It is intended that the invention cover all modifications and alternatives which may be included within the spirit and scope of the invention.

Currently, GPS satellites transmit two microwave carrier signals. The L1 frequency is set at 1575.42 megahertz and carries the navigation message and the standard positioning service code signals. The other microwave carrier signal, L2, operates at 1227.60 MHz and is used by the precise positioning service to calculate ionoshperic delay. Standard positioning service is used chiefly by civil users worldwide without charge or restrictions. The precise positioning service is used only by users equipped with appropriate cryptographic equipment and keys.

There are three binary codes that shift the L1 and/or the L2 carrier phase. The Coarse Acquisition (C/A) code modulates the L1 carrier phase to spread its spectrum over a 2 MHz, bandwidth. The C/A code is a pseudo random noise code which repeats every 1023 bits. Each GPS satellite has a different C/A code.

The Navigation Message modulates the L1-C/A code signal. The Navigation Message is a 50 Hz signal which consists of data bits that describe the GPS satellite or bits, clock corrections and other system parameters. Such information is used by the receiver to update its almanac.

Referring to the drawing, FIG. 1 illustrates a typical GPS Precise code or P-Code sequence. While the P-Code sequence is shown, it is not intended that the present invention be limited to use with solely P-Code. The present invention may also be used in conjunction with Y-Code and the widely available C/A code as well. The P-Code modulates both the L1 and L2 carrier phases. The GPS P-Code that is generated in each satellite is a seven day long segment of a longer ranging code that has a complete cycle of 267 days. The satellite P-Codes are themselves products of two pseudo random noise codes X1(t) and X2(t+$n_i$T), where $0 \leq n_i \leq 36$. Each satellite has a unique phase offset, $n_i$T, which results in 37 unique/mutually exclusive segments of the 267 day cycle. The overall 267 day period has in effect been subdivided so that each satellite gets a one-week period that is non-overlapping with every other satellite.

The present invention is an extension of the GPS code division multiplex scheme. A positioning system using pseudolites uses an augmentation code from one of the existing 37 unique code phases 12 of the GPS Satellite P-Code Sequence 10 and inserts a time offset 14 for any one or more of the 37 pseudo random noise codes 12. The time offset, usually done in multiples of one or more hours, minimizes unintentional acquisition/track by a receiver searching for a true satellite signal. P-Code, or in the encrypted form, Y-Code, equipment with a reasonable knowledge of time-of-day, typical of all military receivers, can easily bracket code searches to acquire and track only the intended transmitter. For example, if the time offset 14 was one hour, the separation in code space would be $10.23 \cdot 10^6$ chips/sec·3600 sec/hr or $3.68 \cdot 10^{10}$ P-Code chips. When a receiver is in use which is not bracketing for, or selectively searching for, the transmitter using the time offset, the receiver would take over 1,000 hours of search time to inadvertently acquire the wrong signal. As receiver software is typically designed to preclude excessively long code searches, acquisition of the wrong signal is all but eliminated.

Further, any modernization of the GPS System that will result in constellations of greater than 30 satellites will mean an increasingly crowded group of pseudo random noise codes coming from space. A pseudolite augmentation transmitter using an offset, such as the time offset 14, would send out a pseudo random noise code which would be received by a receiver that has been programmed to bracket its search, as if time were actually the time offset value of hours ahead or behind. The receiver would lock on the correct signal being sent out by the pseudolite augmentation transmitter using the offset. This enables the receiver to use commonly known mathematics to calculate its position relative to the transmitter or any other known location. A time offset would also work in a similar manner with C/A codes. Such augmented signals could be used to solve near/far and multipath problems.

By incorporating an offset into the pseudo random noise codes used by pseudolites, a receiver which has been programmed to search for pseudo random noise codes incorporating the offset will automatically miss, or not lock onto, GPS pseudo random noise codes. This allows the pseudolite system user to have an accurate system that will operate with great accuracy and with minimal interference. Further, a user of the GPS system will not lock onto any of the pseudolite pseudo random noise codes incorporating the offset. This will lower, if not eliminate, errors caused by pseudolite pseudo random noise code interference.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. A method of identifying a pseudo random noise code signal comprising:

transmitting a pseudo random noise code signal including a time offset;

receiving said pseudo random noise code signal;

searching for said pseudo random noise code signals wherein said search is based on said time offset; and identifying said pseudo random noise code signal by matching the received pseudo random noise code signal to a stored pseudo random noise signal.

2. The method of claim 1 wherein the time offset is of one or more hours.

3. The method of claim 1 wherein the pseudo random code signal without the offset is equivalent to a GPS pseudo random noise code signal.

4. The method of claim 3 wherein the GPS pseudo random noise code signal is a P-code.

5. The method of claim 3 wherein the GPS pseudo random noise code signal is a Y-code.

6. The method of claim 3 wherein the GPS pseudo random noise code signal is a C/A-code.

7. A method of utilizing pseudo random noise code signals generated by pseudo satellites, the method comprising:

transmitting a pseudo random noise code signal from a pseudo satellite wherein said pseudo random noise code signal includes a time offset;

searching for any pseudo random noise code signal for less time than said time offset.

8. The method of claim 7 wherein said time offset is one or more hours.

9. The method of claim 7 wherein said pseudo random noise code signal is a GPS pseudo random noise code signal.

10. The method of claim 9 wherein the GPS pseudo random noise code signal is a P-code.

11. The method of claim 9 wherein the GPS pseudo random noise code signal is a Y-code.

12. The method of claim 9 wherein the GPS pseudo random noise code signal is a C/A-code.

13. A method of processing pseudo random noise code signals which are generated by pseudo satellites, the method comprising the steps of:

receiving a time offset pseudo random noise code signal;

performing a search for said time offset pseudo random noise code signal, wherein said search is based on a time offset of said time offset pseudo random noise code signal;

identifying said time offset pseudo random noise code signal by matching the received time offset pseudo random noise code signal to a stored pseudo random noise signal.

* * * * *